United States Patent [19]
Koch et al.

[11] Patent Number: 5,836,547
[45] Date of Patent: Nov. 17, 1998

[54] ATTENUATED SEAT BACK ASSEMBLY FOR AN AIRCRAFT PASSENGER SEAT

[75] Inventors: Roger Koch, Miami Shores; Ronald Grilliot, Plantation; Mark Larson, Pembroke Pines, all of Fla.

[73] Assignee: Aircraft Modular Products, Inc., Miami, Fla.

[21] Appl. No.: 630,009

[22] Filed: Apr. 8, 1996

[51] Int. Cl.$^6$ .......................... B60N 2/42; B60R 21/055; B64D 25/04; B64D 25/00

[52] U.S. Cl. ................... 244/122 R; 244/118.6; 244/121; 297/216.12; 280/751

[58] Field of Search ................ 244/118.6, 121, 244/122 R; 297/216.1, 216.12, 216.13, 216.14, 452.13, 452.56; 280/748, 751

[56] References Cited

U.S. PATENT DOCUMENTS

| | | | |
|---|---|---|---|
| 3,330,598 | 7/1967 | Whiteside | 297/451.13 |
| 3,680,912 | 8/1972 | Matsuura | 297/216.12 |
| 4,252,341 | 2/1981 | Barecki et al. | 280/751 |
| 4,335,918 | 6/1982 | Cunningham | 280/751 |
| 4,718,720 | 1/1988 | Braun et al. | 297/216.12 |
| 4,919,483 | 4/1990 | Horkey | 297/216.12 |
| 5,039,162 | 8/1991 | Yoshida | 297/216.1 |
| 5,269,590 | 12/1993 | Carilli | 297/216.1 |
| 5,340,059 | 8/1994 | Kanigowski | 244/118.5 |
| 5,482,230 | 1/1996 | Bird et al. | 244/121 |
| 5,580,124 | 12/1996 | Dellano | 297/216.12 |
| 5,649,721 | 7/1997 | Stafford et al. | 244/121 |

FOREIGN PATENT DOCUMENTS

| | | | |
|---|---|---|---|
| 06278512 | 4/1994 | Japan | 297/216.13 |

*Primary Examiner*—Virna Lissi Mojica
*Attorney, Agent, or Firm*—Malloy & Malloy, P.A.

[57] ABSTRACT

An attenuated aircraft seat back assembly for use on an aircraft passenger seat of the type which includes a seat back frame with a front side and a rear side, the attenuated assembly comprising a mount assembly structured to be secured at the rear side of the seat back frame, preferably at an upper end thereof, and an impact absorbent, generally rigid material panel fixedly secured thereto. The mount assembly is structured to securely maintain the rigid material panel in a generally parallel orientation relative to the seat back frame, and spaced apart from the seat back frame by a predetermined distance. The rigid material panel, which is sized and configured to shield an upper region of the seat back frame, is substantially lightweight and includes a honeycomb interior core structured and disposed to substantially resist the force of a direct impact thereto, while still yielding sufficiently so that an object impacting the rigid material panel will have a Head Injury Criteria (HIC) value which is acceptable under current Federal Aviation Administration regulations. Preferably, an energy absorbent, resilient material panel is adhered to a front face of the rigid material panel, and together have a combined thickness of generally about two inches, while being spaced apart from the seat back frame in assembled form so as to minimize an overall thickness of the assembly.

19 Claims, 3 Drawing Sheets

FIG. 1
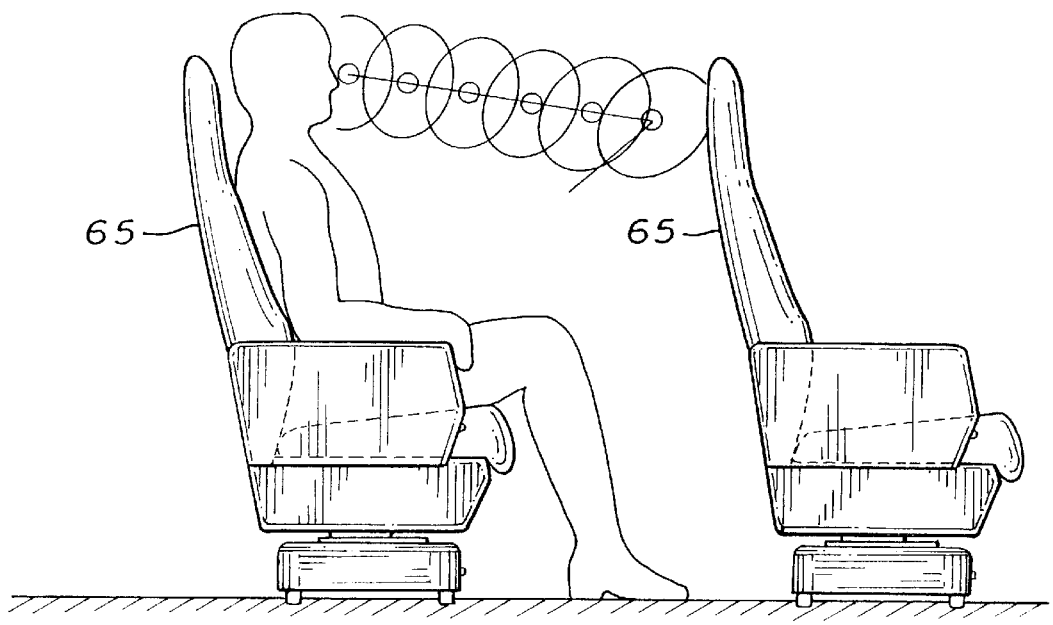
FIG. 1-A
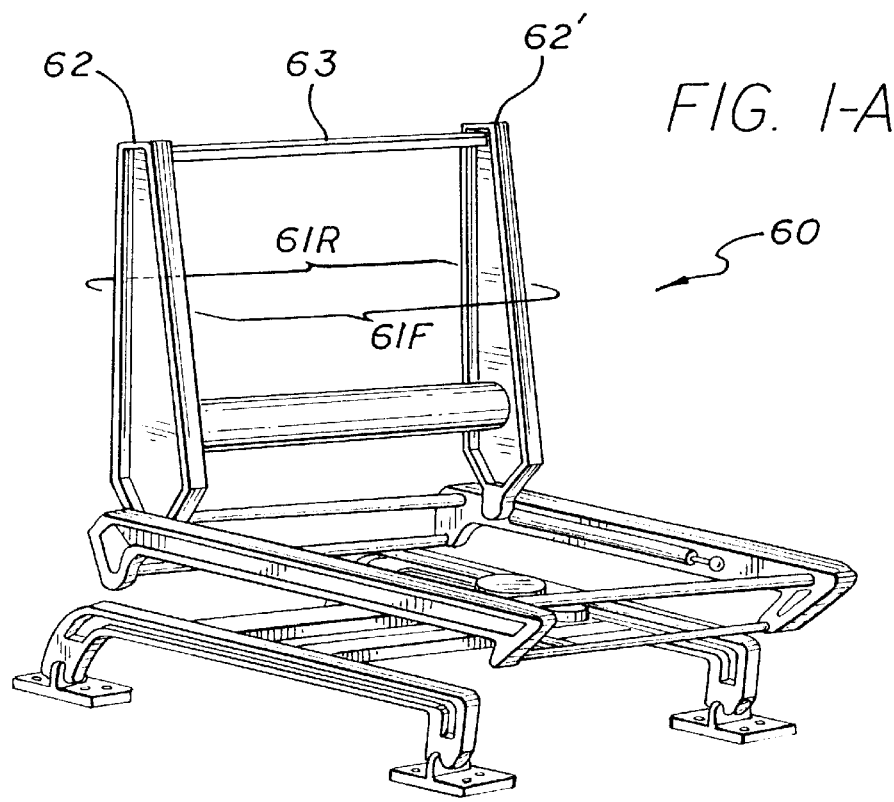

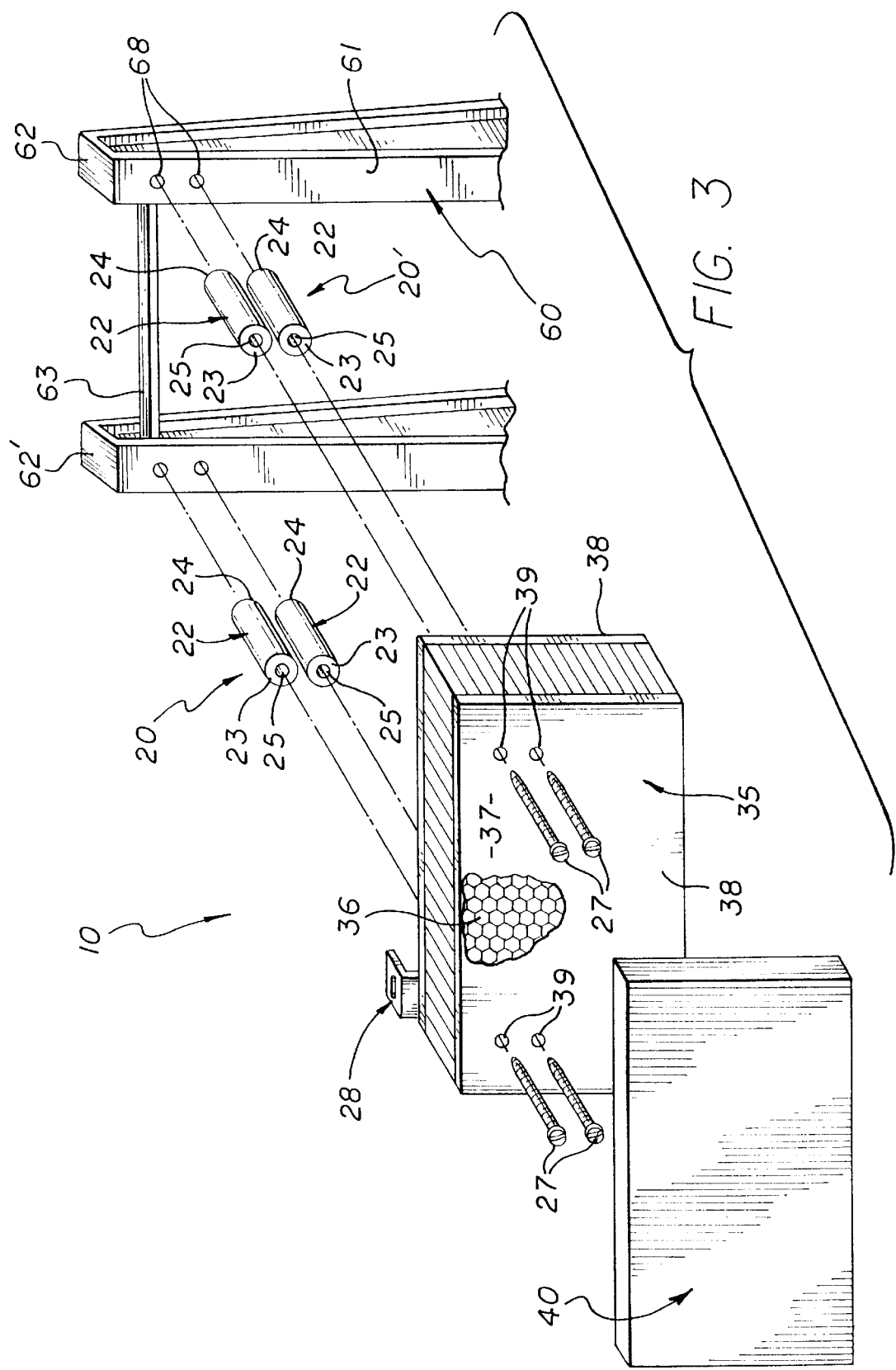

ATTENUATED SEAT BACK ASSEMBLY FOR AN AIRCRAFT PASSENGER SEAT

BACKGROUND OF THE INVENTION

1. Field of the Invention

The present invention relates to an attenuated seat back assembly for use within an aircraft and preferably on an aircraft passenger seat back, which assembly greatly reduces the likelihood that a passenger will suffer severe head injury should the aircraft crash, and which meets, if not exceeds the Head Injury Criteria (HIC) testing requirements of the Federal Aviation Administration (FAA). In addition, the assembly of this invention does not add substantial weight to the aircraft and further, permits optimal spacing between rows of aircraft seats.

2. Description of the Related Art

In the aircraft industry, aircraft design has traditionally emphasized the airworthiness of the aircraft and has not focused on the crashworthiness of the aircraft. In the last several years however, the crashworthiness of the aircraft has received considerable attention and in fact, the Federal Aviation Administration (FAA) has developed an entirely new set of dynamic performance standards aimed at least in part at the improved crashworthiness of aircraft seats. These new dynamic standards, which are based on aircraft accident data mandate greatly improved occupant impact protection. In an immensely significant way, aircraft passenger seats in particular have been affected in that they must now undergo new and very strict dynamic testing imposed by the FAA before they can be utilized within an aircraft. A monumental hurdle confronting the manufacturers of aircraft passenger seats is how to make a high strength aircraft seat which can pass the new FAA dynamic seat tests which at the same time, is not unduly heavy nor bulky. This is because in the commercial aircraft industry, the harsh economic reality is that an unduly heavy aircraft is less fuel efficient thereby costing more to operate and further, an unduly bulky interior configuration wastes precious cargo space, which again equals lost revenue. For this reason, aircraft seat manufacturers are now trying to balance the safety requirements imposed on aircraft passenger seats with the aircraft industry concerns of minimizing an aircraft's weight while simultaneously, maximizing an aircraft's interior space.

In particular, one of the new FAA dynamic testing regulations imposed on aircraft passenger seats relates to reducing the likelihood that a passenger will suffer severe head injury during a crash. Specifically, in an airplane crash situation, a passenger's head is likely to be thrust forward towards the aircraft seat or bulkhead directly in front of him/her, and to strike that object with a sufficient force so as to cause severe head trauma to the passenger, particularly if the seat back directly in front of the passenger is rigidly constructed. The most widely used and accepted measure of potential head injury is the Head Injury Criteria (HIC), which is used as a head injury criteria in the Federal Motor Vehicle Safety Standard No. 208. The HIC is a method for defining an acceptable limit, and specifically, is a weighted impulse integral between a selected initial and final time interval that contains a maximum value of the resultant acceleration at the center of mass of the head. The suggested maximum value of the HIC should not exceed 1000 with a time base not to exceed 50 microseconds, for head impact against broad interior surfaces in a crash. Very few, if any, of traditional aircraft passenger seats are able to pass the suggested HIC maximum value of 1000.

Since the advent of the new FAA dynamic testing standards, including the HIC, very few aircraft passenger seats have been designed to solve the HIC failure problem, without compromising other important criteria. For example, one solution available to aircraft manufacturers is to reduce the spacing between rows of aircraft passenger seats. As the spacing between the seat rows on an aircraft is reduced, a passenger's head does not have sufficient time to accelerate to a significant speed from which the impact deceleration would otherwise exceed the HIC test. Of course, such space reduction between seat rows would interfere with passengers' ability to exit the aircraft, would make seating very uncomfortable for passengers, who at times may already feel cramped in conventional aircraft seat arrangements, and would not permit other aircraft seat features such as reclining and tray table extension. Another potential solution to providing an aircraft passenger seat which passes the HIC test is to secure a thick, absorbent foam padding to the seat back. However, it has been determined that up to about fourteen inches of such padding would be required in order to pass the HIC test, which if utilized, would severely encroach upon the seating area of each passenger as a result of the substantially large protrusion which would necessarily extend from the seat back directly forward of him/her. Another potential solution is to provide aircraft seats with a substantially flexible seat back so that when the head of a passenger seated behind the seat back crashes into the seat back, the seat back will flex forward, the flexing action being sufficient to dampen the impact deceleration to within acceptable limits. Unfortunately, such flexing motion of the seat back may operate to make the aircraft seat fail other tests of the new FAA dynamic seat testing. Further, the forward flexing motion of the seat back during a crash could cause a passenger seated therein severe spinal injury. Finally, not every passenger seat has another passenger seat in front of it but may instead face a bulkhead or other rigid interior structure. As a result, many aircraft makers have been forced to reluctantly accept increased spacing between the rows of aircraft passenger seats as a way for passing the HIC test. As can be appreciated, by allowing more room between rows of aircraft seats, sufficient room can be had so as to avoid a collision between a passenger's head and a seat back directly forward of the passenger, in essence, providing enough clearance so that a passenger's head will not impact the forward seat back at all. However, allowing more room between rows of aircraft seats generally requires less rows of passenger seating within the aircraft. Consequently, less passengers can be seated or paying cargo boarded, all of which can lead to substantial financial loss for the aircraft owner. It should now be apparent that aircraft and aircraft seat manufacturers have to date, been confronted with unacceptable solutions for passing the new stringent FAA dynamic testing standards, and in particular, the HIC test.

Accordingly, there is a substantial need in the art for a an aircraft seat back assembly which will pass the HIC test imposed by the recent FAA dynamic seat standards. There is also a substantial need in the art for such a seat back assembly to be attenuated so that the overall dimension of a standard aircraft passenger seat can be maintained, if not improved, and further, so that a standard spacing distance can be maintained between rows of aircraft seats, if not improved while preserving passenger safety and comfort.

SUMMARY OF THE INVENTION

The present invention is directed towards an attenuating aircraft seat back assembly designed to pass the HIC test imposed by the recent FAA dynamic seat standards and to further satisfy the significant economic needs in the art. The present invention is preferably to be used in combination with an aircraft passenger seat of the type which includes a seat back, the seat back including a seat back frame having a front side and a rear side onto which the attenuating assembly of the present invention is secured. In an alternative embodiment, the attenuating assembly of this invention may be secured to another rigid structure within the aircraft such as a bulkhead located forward of an aircraft passenger seat.

In the preferred embodiment, the attenuating assembly of this invention includes a mount assembly. The mount assembly has an interior engagement segment and an exterior engagement segment which are disposed a predetermined distance from one another. The interior engagement segment of the mount assembly is secured at the rear side of the seat back frame so that the exterior engagement segment of the mount assembly is maintained in a spaced apart relation from the seat back frame. An impact absorbent, generally rigid material panel is structured to be fixedly secured at the exterior engagement segment of the mount assembly and is structured to be positioned in generally parallel, spaced relation to the seat back frame, and further, is generally thin so as to minimize an overall thickness of the seat back. This rigid material panel is also specifically structured to substantially resist a direct impact thereto, while still yielding sufficiently to minimize a deceleration of an impacting object to within acceptable limits of the HIC test as established by the FAA, without completely yielding.

It is a primary object of the present invention to provide an attenuating assembly for use on an aircraft passenger seat back which greatly reduces the likelihood that a passenger will suffer severe head injury should the aircraft crash.

It is also an object of the present invention to provide an attenuating aircraft seat back assembly which meets, if not exceeds the HIC testing requirements of the new FAA dynamic seat standards.

Another object of the present invention is to provide an attenuating aircraft seat back assembly which is not bulky, but rather, is substantially thin so that the overall dimension of a standard aircraft passenger seat can be maintained, if not improved, while at the same time, preserving passenger safety and comfort.

An additional object of the present invention is to provide an attenuating aircraft seat back assembly which is substantially lightweight and easy to utilize and implement on passenger seats within an aircraft and yet, which permits an acceptable spacing distance to be maintained between rows of aircraft seats, if not an improved spacing distance, while at the same time, preserving passenger safety and comfort.

A further object of the present invention is to provide an attenuating aircraft seat back assembly which is substantially thin and yet which is structured to substantially resist impact, while simultaneously being capable of yielding sufficiently so as to lessen the impact deceleration of an object striking its surface.

Yet another object of the present invention is to provide an attenuating aircraft seat back assembly which passes the HIC test and yet, which permits the aircraft passenger seat with which the assembly is utilized to include high strength rigid materials which are necessary in order for the aircraft passenger seat to meet other testing criteria of the new FAA dynamic seat standards.

Still another object of the present invention is to provide an attenuating assembly which can be utilized in combination with another rigid interior surface within an aircraft such as a bulkhead.

BRIEF DESCRIPTION OF THE DRAWINGS

For a fuller understanding of the nature of the present invention, reference should be had to the following detailed description taken in connection with the accompanying drawings in which:

FIG. 1 is a side view of a passenger seated within a standard aircraft passenger seat and illustrating a likely path of travel for a passenger's head in the unfortunate event that a crash of the aircraft is experienced.

FIG. 1-A is a front perspective view of a type of frame for use as an aircraft passenger seat.

FIG. 3 is a front perspective, partially exploded view of the attenuating assembly of the present invention;

DETAILED DESCRIPTION OF THE PREFERRED EMBODIMENT

As illustrated in FIG. 1, and as has been described, in an airplane crash a passenger's head is likely to be thrust forward towards the aircraft seat or bulkhead directly in front of him/her, and to strike that object with a sufficient force so as to cause severe head trauma to the passenger. This is particularly true if the seat back directly in front of the passenger is rigidly constructed, as is almost always the case, given that aircraft passenger seats must themselves be sturdily constructed of a rigid, high strength material. The Federal Aviation Administration has adopted new dynamic seating standards which include the widely accepted Head Injury Criteria (HIC), as a measure of potential head injury. The present invention is directed towards an attenuated aircraft seat back assembly, which is designed to greatly reduce the likelihood that a passenger will suffer severe head injury in an aircraft crash, and to meet if not exceed, the HIC testing requirements of the FAA.

Figure 2:
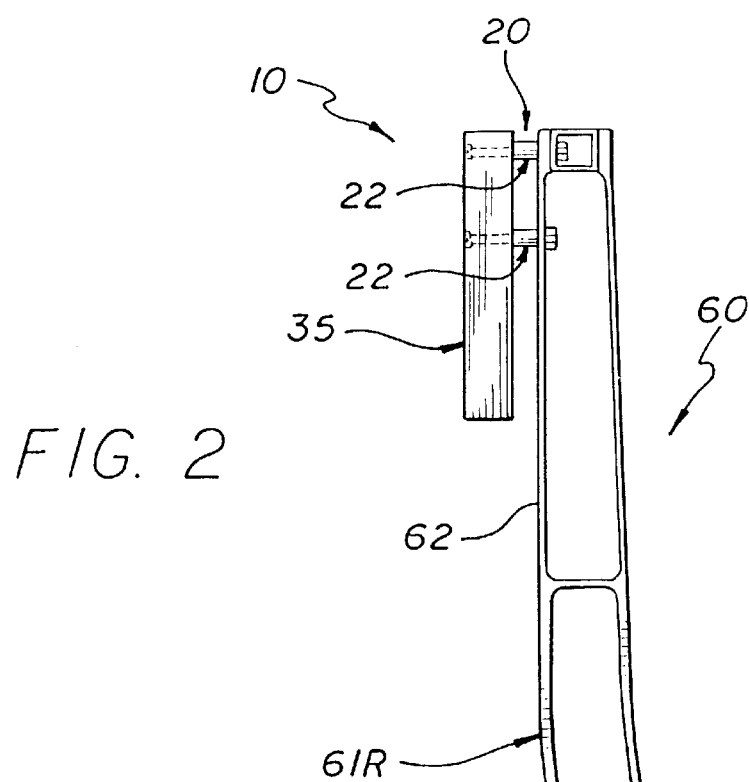
FIG. 2 is a side plan view of the present invention for an attenuating assembly shown mounted for use on and partially illustrating an aircraft passenger seat back.
Figure 4:
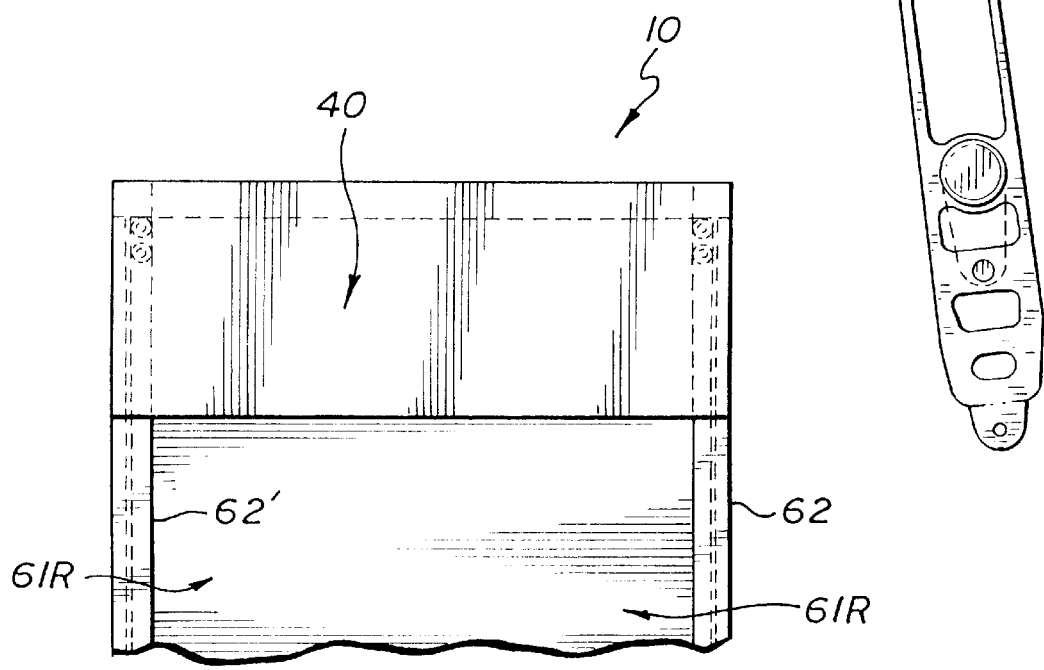
FIG. 4 is a front plan view of the attenuating assembly of the present invention; and Like reference numerals refer to like parts throughout the several views of the drawings.

Illustrated throughout FIGS. 2 through 4, the present invention is directed towards an attenuated assembly, generally indicated as 10. As best illustrated in FIGS. 2 and 3, the attenuated assembly 10 is preferably for use on an aircraft passenger seat of the type which includes a seat back 65 having a seat back frame 60 such as illustrated in FIGS. 1 and 1-A. Generally, the seat back frame 60, which includes a front side 61F and a rear side 61R, is made up of at least one pair of spaced vertical supports 62, 62' and at least one spanning support 63 over which conventional seat padding and upholstery is secured.

Referring now to FIGS. 2 and 3, the attenuated assembly 10 is seen to include a mount assembly 20. The mount assembly 20 includes an interior engagement segment 24 and an exterior engagement segment 23 disposed relative to one another such that upon the interior engagement segment 24 being securely joined to the rear side 61R of the seat back frame 60, the exterior engagement segment 23 is maintained spaced apart from the seat back frame 60 by a predetermined distance. As has been described, in the preferred embodiment, the attenuated assembly 10 is utilized in combination with the rear side 61R of an aircraft seat back frame 60, and the mount assembly 20 acts to secure the assembly 10 thereto, even while undergoing extreme forces such as may arise in the event of a crash. To this end, there may be a single mount assembly 20, but most preferably, there will be at least two mount assembly structures 20 and 20', which as illustrated in FIG. 3, are arranged for securement of the assembly 10 to the upper zone of each vertical support 62, 62' of the seat back frame 60. Also to this end, while the mount assembly 20 may be comprised of a single elongate member or one or more bracket type members, in the preferred embodiment, the mount assembly 20 comprises at least one, but preferably a plurality of spacer elements 22. The spacer elements 22 include a first face which defines the exterior engagement segment 23, and a second face which defines the interior engagement segment 24 and will preferably abut the seat back frame 60 when secured in place.

Further, while the mount assembly 20 of this invention is structured and disposed to secure the assembly 10 to the seat back frame 60, it is also structured and disposed to secure the assembly 10 at a predetermined distance away from the seat back frame 60, thereby defining a spacing gap between absorbent panel section 35 of the assembly 10, described below, and the section of seat back frame 60 to which it is secured. In the preferred embodiment, each of the spacer elements 22 has a length equivalent to the predetermined distance from or desired spacing gap from the seat back frame 60 to the exterior engagement segment 23 of mount assembly 20. Further, in the preferred embodiment of the mount assembly, the individual spacer elements 22 include an axial bore 25 formed therein wherethrough an elongate fastener element 27 is passed and extends to the seat back frame 60 to provide for secure engagement therewith. As illustrated in FIG. 3, the spacer element 22 may be secured to one of the vertical supports 62, 62' with the fastener elements 27 extending through the spacer elements 22 and into corresponding apertures 68 formed in the vertical supports 62, 62'. It will therefore be appreciated that spacer elements 22 allow the attenuated assembly of this invention to be secured to an aircraft seat back frame by utilization of existing apertured structure on frame 60 and therefore, does not in any way alter nor compromise the high strength structure of frame 60 and further, facilitates installation of the assembly 10. Alternatively, however, the spacer elements 22 of the mount assembly 20 may be secured to the cross support 63 that spans the vertical support members 62. Nevertheless, mount assembly 20 will preferably be secured at substantially an upper end of the seat back frame 60 as this area is the most likely structure to be hit by a passenger's head during a crash, and as it is consequently, a primary focus during HIC testing for determining compliance with the FAA regulations. In a most preferred embodiment, the spacer elements 22 have a length of generally about one-half inch, and thereby define the depth of the predetermined space or spacing gap between the exterior engagement segment 23 and the seat back frame 60 as generally about one-half inch.

As best shown in FIGS. 2 and 3, the attenuating aircraft seat back assembly of this invention further comprises an impact absorbent, generally rigid material panel 35, fixedly secured at the exterior engagement segments 23 of each spacer element 22 of the mount assembly 20. The rigid material panel 35 is secured to the mount assembly 20 so as to be positioned in generally parallel, spaced relation to the seat back frame, and as explained above, is preferably spaced apart from the seat back frame 60 by generally about a one-half inch. In the preferred embodiment, the mount assembly 20 is secured to the rigid material panel 35 at generally peripheral points thereon, such as at upper corners of panel 35, without engaging a central region 37 of panel 35, which is the likely the region of impact in the event of a crash. Further, while the rigid material panel 35 may be secured to the mount assembly 20 by a strong adhesive material, more preferably and as illustrated in FIG. 3, elongate fastener elements 27 are passed through corresponding apertures 39 formed in the rigid material panel 35, which extend through the spacer elements 22 of the mount assembly 20 for secure engagement with the seat back frame 60. As such, the rigid material panel 35 is more securely held in place and upon an impact to a central region 37 thereof will exhibit proper shock absorbent tendencies, rather than buckling inwardly and detaching from its secure engagement with the mount assembly 20. Further, it is seen that the rigid material panel 35, which is preferably mounted at an upper end of the seat back frame 60, is sufficiently elongate so as extend downwardly along the seat back frame 60 and to substantially cover the portions of the aircraft passenger seat that are susceptible to head impact by a passenger in a rear seat.

Also in the preferred embodiment, the rigid material panel 35 is generally about one inch thick. It will thus be appreciated that the attenuated assembly of this invention possesses a generally thin configuration in that the overall depth of both the rigid material panel 35 and the spacing gap between panel 35 and seat back frame 60, as created by the mount assembly 20, is generally between one to two inches. This generally thin configuration is a significant improvement in the art because it provides minimal obstruction into the space of a passenger seated behind the aircraft seat back on which the assembly 10 is utilized, which translates into both greater safety for the passenger should he need to swiftly exit his seat and the ability to carry more paying passengers on an aircraft because more rows of aircraft seats can now be utilized. Also existing seat equipment, such as a seat belt guide bracket 28 may be effectively mounted to the rigid material panel so that the belt extends freely through the spacing gap. Further, and as is about to be described, rigid material panel 35 is structured to substantially resist an impacting force directed thereon, while still yielding sufficiently to minimize a deceleration of an impacting object, such as a passenger's head, to within an acceptable HIC limit as established by the FAA.

As illustrated in FIG. 3, in the preferred embodiment, the rigid material panel 35 includes a honeycomb interior core 36. The honeycomb core 36 is preferably formed of a generally lightweight material, having honeycombed chambers formed therein coated with an epoxy or like stiffening material, so as to offer an overall lightweight nature to the rigid material panel 35. A suitable material for utilization as rigid panel 35, which includes such a honeycomb core is marketed under the trademark Nomex® by the Nordan Company which has an address of 510 S. Lansing, Tulsa, Okla. 74120. Furthermore, because of the honeycomb interior core 36 of the rigid material panel 35, which as illustrated in FIG. 3 is oriented and aligned so that the hollow interior of each honeycomb chamber will receive the impact directly, panel 35 offers substantial resistance to compression under the force of an impact. Despite this substantially rigid nature however, the general lightweight, porous nature of the honeycomb interior core 36 when subjected to a large force of impact provide for some controlled yieldability of the rigid material panel 35, and enables it to act as a shock absorber upon being subjected to a focused impact force such as might occur in the situation illustrated in FIG. 1.

Additionally, in the preferred embodiment of this invention, the rigid material panel 35 includes at least one but preferably a pair of strong, stiff material skins 38 disposed on the main and rear surfaces of the rigid material panel 35, thereby encasing and further strengthening the honeycomb interior core 36. Preferably, each material skin 38 is constructed of a substantially thin fiberglass sheet, which upon sandwiching the honeycomb interior core 36 therebetween adds to the substantial strength offered by the honeycomb core 36 when undergoing a compressing force.

In the preferred embodiment, the rigid material panel further comprises preferably an energy absorbent, resilient material panel 40. This resilient material panel 40 is preferably adhesively secured to a front face of the rigid material 35 and is formed of a type of foam material. Most preferably, the foam material is a medium density, open-celled foam formed of polyurethane or like material which is substantially lightweight. In addition, the foam material utilized for resilient material panel 40 has substantial shock absorbent qualities that add to the overall shock absorbent nature of the present invention and further, will be used as panel 40 to cover at least the central region 37 of rigid material panel 35, if not the entire surface thereof. It will therefore be appreciated that resilient material panel 40 provides an initial buffer for the head of a passenger as it impacts an aircraft passenger seat back according to the illustrated scenario of FIG. 1, prior to impact with the rigid material panel 35. A suitable foam material for utilization as resilient material panel 40, which offers the desired density, and open celled, impact absorbent features is marketed under the trademark Confor™ by E. A. R. Specialty Composites, a Division of Cabot Safety Corporation which has an address of 7911 Zionsville Road, Indianapolis, Ind. 46268. In a most preferred embodiment, the thickness of resilient material panel 40 is generally about one inch thick and as such, the substantially thin nature of the attenuated assembly 10 is preserved, without compromising the shock absorbent qualities thereof. Specifically, the attenuated assembly 10 of the present invention has an overall thickness of generally about two and one-half inches when considering: approximately a one-half inch spacing gap between the rigid material panel 35 and the seat back frame 60, approximately a one inch thick rigid material panel 35, and approximately a one inch thick resilient material panel 40. The highly beneficial advantages of the assembly's slender configuration have been discussed above, but moreover, the configuration of the attenuated assembly 10 is believed to be equivalent to the degree of shock-absorption offered by a foam padding which is fourteen inches thick. As has been explained, while utilizing fourteen inches of foam padding on a seat back frame may meet the accepted maximum value for the HIC test, it is virtually unacceptable for implementation on an aircraft because of the hazard to passenger ingress and egress and because of the resulting economically irresponsible seat arrangement it would require within an aircraft. Other advantages offered by attenuated aircraft seat back assembly 10 of the present invention include the ability to conventionally upholster and fit the aircraft passenger seat on which it is used with a standard tray table, without significantly increasing the overall depth thereof, thereby maintaining safe passenger ingress and egress and an economically feasible arrangement of passenger seats within an aircraft.

Another feature of the attenuated assembly 10 of the present invention is that it may be utilized in combination with other objects found within an aircraft such as on a bulkhead where a passenger's head may impact during a crash. In such instances, the mount assembly 20 may have to be expanded so as to secure a possibly larger assembly thereto, but other features of the assembly may remain essentially the same, such as the spacing gap, the rigid material panel 35, resilient panel 40 and the assembly's slender configuration. It will therefore be appreciated that the attenuated assembly 10 of this invention is particularly suitable for being implemented on or as part of custom aircraft seating, which may include passenger support objects such as divans, tables and other types of furniture.

Turning to the FAA's new dynamic seat tests and specifically to the Head Injury Criteria (HIC) test, it is pointed out that a test dummy is generally strapped into an aircraft passenger seat behind the seat to be tested and then undergoes a simulated crash which propels the dummy's head with substantial impact force towards the seat back being tested. The force of the impact and the impact deceleration are calculated, which must be beneath the FAA maximum value for HIC. In the case of the attenuated assembly 10 of the present invention, the overall strength provided by structure of the rigid material panel 35 and its secure mounting to seat back frame 60, operate to prevent the test dummy's head from completely compressing or breaking through the assembly 10 and thereby, preventing a critical impact with rigid seat frame 60. At the same time however, the specific honeycomb configuration and thickness of the rigid material panel 35, as well as the approximately one-half inch spacing gap between the rigid material panel 35 and the seat back frame 60 permit the rigid material panel to exhibit a degree of yielding under the substantially strong impact forces. That limited amount of yielding enables the rigid material panel 35 to act as a damper which minimizes the overall deceleration of the dummy's head as it impacts the assembly. As previously recited, immediate deceleration, such as when the test subject strikes a rigid unyielding object is substantially high and will naturally result in severe trauma to the affected passenger, but in the case of the attenuated assembly 10 of the present invention, the use of an approximately one inch thick rigid material panel 35, spaced approximately one half inch from the seat back frame 60 provides substantial shock absorption and impact attenuation to lower the deceleration exhibited to within acceptable FAA HIC regulations.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An attenuated aircraft seat back assembly for an aircraft passenger seat of the type which includes a seat back having a seat back frame with a front side and a rear side, said attenuated assembly comprising:

a mount assembly, said mount assembly including an interior engagement segment and an exterior engagement segment, said interior engagement segment of said mount assembly being structured to be secured at the rear side of the seat back frame, thereby maintaining said exterior engagement segment of said mount assembly spaced apart a predetermined distance from the seat back frame, an impact absorbent, generally rigid material panel, said rigid material panel being structured to be fixedly secured at said exterior engagement segment of said mount assembly so as to be disposed in generally parallel, spaced apart relation to the seat back frame, said rigid material panel being generally thin so as to minimize an overall thickness of the seat back, and said rigid material panel being structured to substantially resist a direct impact thereto, while still yielding sufficiently so that an object impacting said panel will have a generally acceptable Head Injury Criteria (HIC) value of 1000 or less.

2. An attenuated aircraft seat back assembly as recited in claim 1 wherein said rigid material panel includes a honeycomb interior core structured and aligned to resist impacts directed into a main surface of said rigid material panel.

3. An attenuated aircraft seat back assembly as recited in claim 2 wherein said rigid material panel includes a strong, stiff, material skin disposed on said main surface and on a rear surface of said rigid material panel so as to encase said honeycomb interior core.

4. An attenuated aircraft seat back assembly as recited in claim 3 wherein said material skin is constructed of fiberglass.

5. An attenuated aircraft seat back assembly as recited in claim 1 wherein said rigid material panel is generally about one inch thick.

6. An attenuated aircraft seat back assembly as recited in claim 1 wherein said rigid material panel is secured at said exterior engagement segment of said mount assembly by at least one elongate fastener element which extends, at least partially therethrough into secure engagement with said mount assembly.

7. An attenuated aircraft seat back assembly as recited in claim 1 wherein said rigid material panel is secured at said exterior engagement segment of said mount assembly by an adhesive material bond.

8. An attenuated aircraft seat back assembly as recited in claim 1 wherein said mount assembly is secured to the seat back frame at an upper end thereof and said rigid material panel depends from said mount assembly in a downwardly depending relation.

9. An attenuated aircraft seat back assembly as recited in claim 1 wherein said rigid material panel is substantially lightweight.

10. An attenuated aircraft seat back assembly as recited in claim 1 further including an energy absorbent, resilient material panel secured to a front face of said rigid material panel.

11. An attenuated aircraft seat assembly as recited in claim 10 wherein said resilient material panel is constructed of a medium density, open celled foam.

12. An attenuated aircraft seat assembly as recited in claim 10 wherein said resilient material panel is generally about one inch thick.

13. An attenuated aircraft seat assembly as recited in claim 1 wherein said engagement segments of said mount assembly comprise a plurality of spacer elements which define said predetermined distance between said rigid material panel and the seat back frame.

14. An attenuated aircraft seat assembly as recited in claim 1 wherein said predetermined distance which said rigid material panel is spaced from the seat back frame is generally about one half inch.

15. An attenuated aircraft seat back assembly as recited in claim 13 wherein said spacer elements which comprise said mount assembly are generally spaced apart from one another so as to support said rigid material panel and maintain a central impact region of said rigid material panel spaced apart from the seat back frame while permitting deflection thereof toward the seat back frame.

16. An attenuated aircraft seat back assembly for an aircraft passenger seat of the type which includes a seat back having a seat back frame with a front side and a rear side, said attenuated assembly comprising:

a mount assembly, said mount assembly including an interior engagement segment and an exterior engagement segment, said mount assembly including a plurality of spacer elements, each of said spacer elements having a central bore therethrough and being of a predetermined length, an impact absorbent, generally rigid material panel, said rigid material panel being structured to be fixedly secured to said spacer elements, said spacer elements being further structured to be secured to the rear side of the seat back frame, near an upper end thereof, so as to securely maintain said rigid material panel a predetermined, generally parallel, spaced apart distance from the seat back frame, said rigid material panel being substantially lightweight and including a honeycomb interior core structured and disposed to substantially resist yet yield under the force of a direct impact thereto, said rigid material panel being sized, structured and configured to substantially shield an upper region of the seat back frame, an energy absorbent, resilient material panel adhered to a front face of said rigid material panel, and said rigid panel and said resilient material panel having a combined thickness of generally about two inches and being spaced apart from the seat back frame in assembled form by generally about a one-half inch so as to minimize an overall thickness of said assembly.

17. An attenuated aircraft seat back assembly as recited in claim 16 wherein said assembly comprises at least two spacer elements secured to the seat back frame and said rigid material panel such that said rigid material panel depends from said spacer elements in a downwardly depending relation.

18. An attenuated assembly as recited in claim 17 wherein said spacer elements are secured to said rigid material panel at points generally about a periphery thereof so as to expose a central impact region on said rigid material panel.

19. An attenuated assembly for an aircraft interior for shielding a rigid structure located within an aircraft, said assembly comprising:

a mount assembly, said mount assembly including an interior engagement segment and an exterior engagement segment, said interior engagement segment of said mount assembly being structured to be secured at the rigid structure located within the aircraft, thereby maintaining said exterior engagement segment of said mount assembly spaced apart a predetermined distance from the rigid structure located within the aircraft, an impact absorbent, generally rigid material panel, said rigid material panel being structured to be fixedly secured at said exterior engagement segment of said mount assembly so as to be disposed in generally parallel, spaced apart relation to the rigid structure located within the aircraft, said rigid material panel being substantially lightweight, generally about one inch thick and including a honeycomb interior core structure to substantially resist a direct impact thereto, while still yielding sufficiently so that an object impacting said rigid material panel will have a generally acceptable Head Injury Criteria (HIC) value of 1000 or less, said rigid material panel further including a strong, stiff, material skin disposed on a main surface and on a rear surface of said rigid material panel so as to encase said honeycomb interior core, a resilient material panel comprising a medium density, open-celled foam material adhered to said main surface of said rigid panel, and said rigid material panel and said resilient material panel having a combined thickness of generally about two inches and in assembled form, being spaced apart from the rigid structure located within the aircraft by generally about one half inch so as to minimize an overall thickness of said assembly.

\* \* \* \* \*